Nov. 23, 1954   H. J. COOPER   2,695,040
SELVEDGE FORMING MECHANISM
Original Filed Oct. 11, 1950   6 Sheets-Sheet 1

Inventor
Henry James Cooper
By
Ferdinand Forster Bosshardt
Attorney

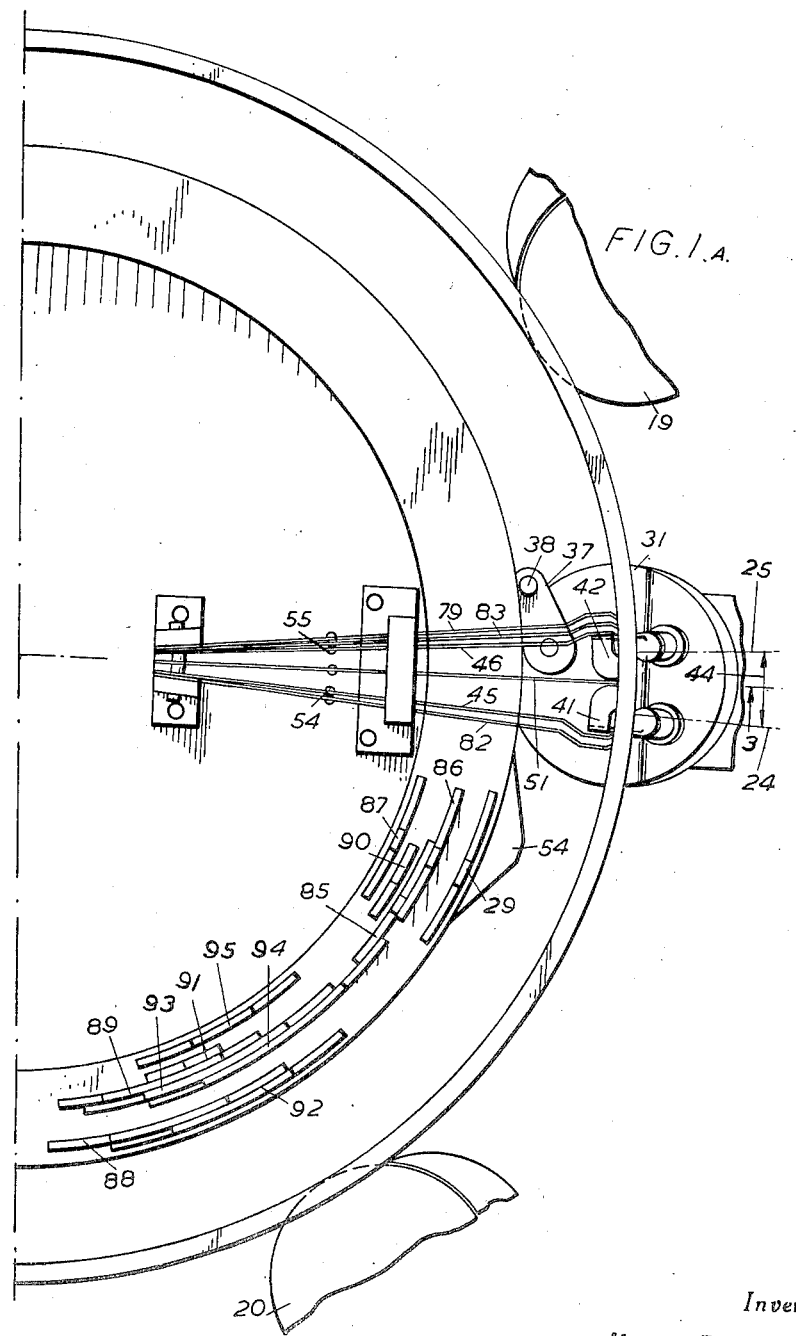
FIG.1.A.

Nov. 23, 1954  H. J. COOPER  2,695,040
SELVEDGE FORMING MECHANISM
Original Filed Oct. 11, 1950  6 Sheets-Sheet 3
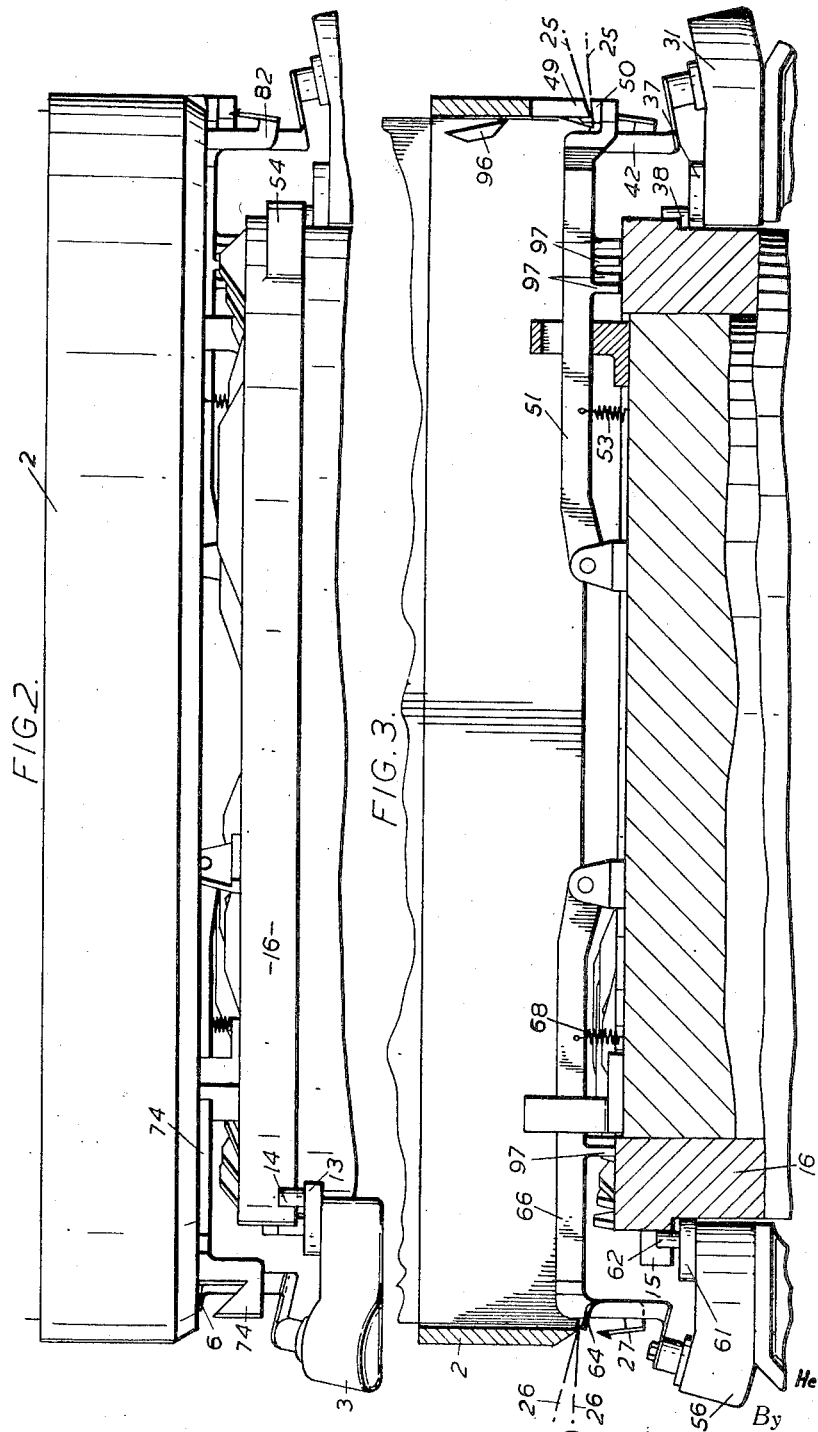
Inventor
Henry James Cooper
By
Ferdinand Broter Bosshardt
Attorney

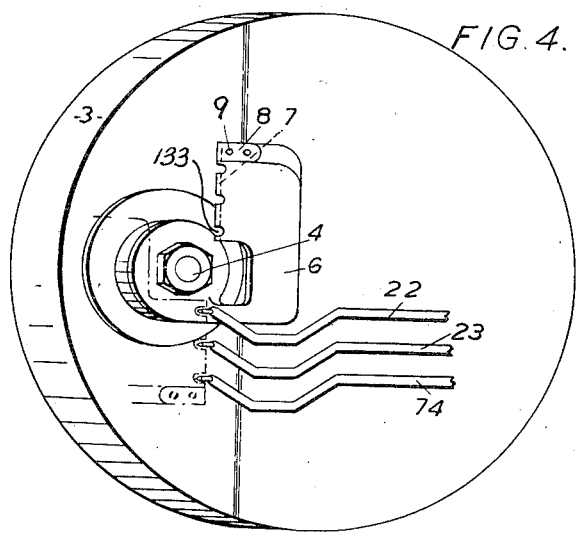
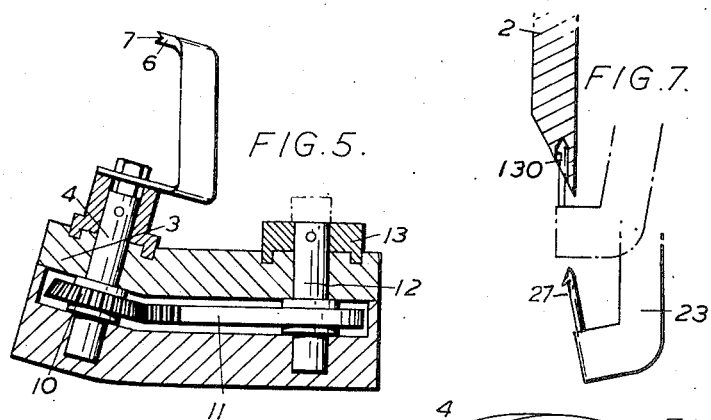
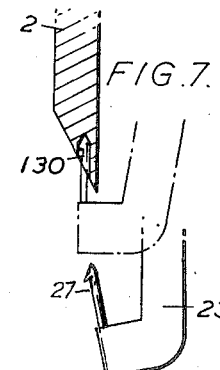
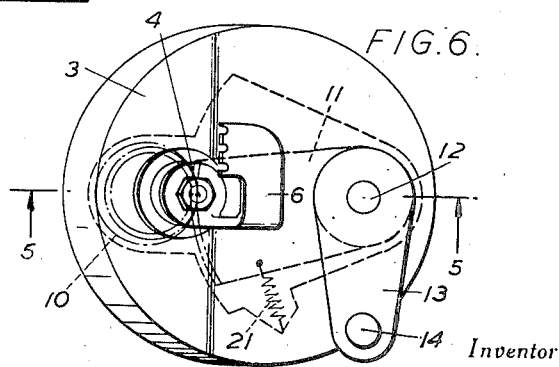

Nov. 23, 1954 H. J. COOPER 2,695,040
SELVEDGE FORMING MECHANISM
Original Filed Oct. 11, 1950 6 Sheets-Sheet 5

Inventor
Henry James Cooper
By
Ferdinand Broster Boshardt
Attorney

Nov. 23, 1954     H. J. COOPER     2,695,040
SELVEDGE FORMING MECHANISM
Original Filed Oct. 11, 1950     6 Sheets-Sheet 6
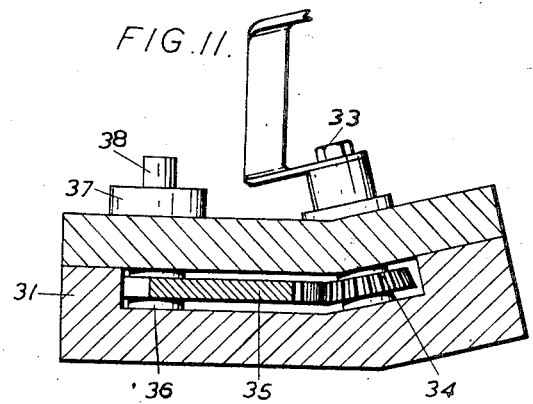
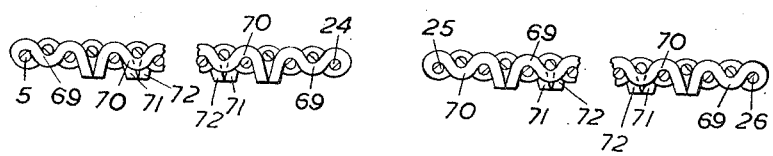
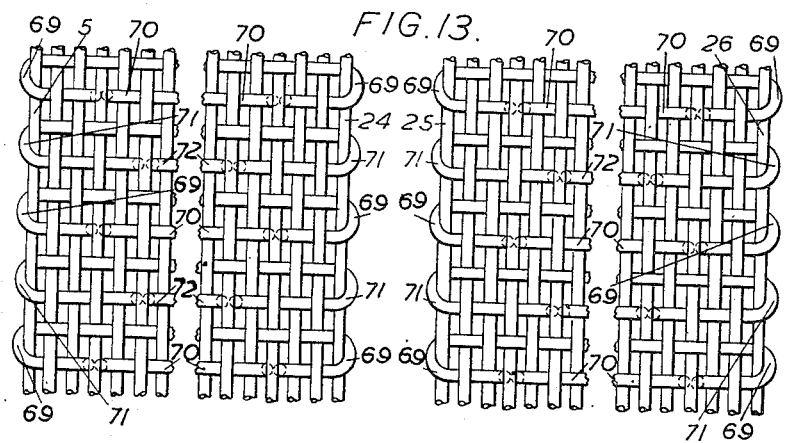
Inventor
*Henry James Cooper*
By
Ferdinand Broter Bosshardt
*Attorney*

United States Patent Office 2,695,040
Patented Nov. 23, 1954

2,695,040
SELVAGE FORMING MECHANISM

Henry James Cooper, Stockport, England

Original application October 11, 1950, Serial No. 189,602, now Patent No. 2,637,351, dated May 5, 1953. Divided and this application May 15, 1952, Serial No. 287,970

6 Claims. (Cl. 139—13)

This invention relates to mechanisms for weaving selvedges for woven fabrics, the selvedges being of the kind described in the specification of my application for a patent, Serial No. 189,602, filed October 11, 1950, which matured into Patent No. 2,637,351, issued May 5, 1953, and of which this application is a division, in which kind none of the weft threads is continuous with another.

The selvedge described in the said specification has alternate weft threads terminating at parts of the warp which are not at its edges and portions of the remaining weft threads turned into and woven in the warp substantially to fill the gaps left by the termination of the first named warp threads short of the edges of the warp.

The points of termination of different alternate weft threads may be in staggered positions and the points of termination of the remaining weft threads be correspondingly staggered.

According to the said invention a mechanism suitable for producing the said selvedge, has an arm to engage and turn an end of each alternate weft thread into the warp after the said thread has been inserted and a subsequent change of shed of the warp has taken place, and a hook or hooks which are pushable through the warp and then withdrawable to draw the extremities of the said ends and the ends of the remaining weft threads through to one face of the warp sheet.

A trapping member or members co-operating with a stationary part are provided to hold the said remaining weft threads from slipping longitudinally in the warp.

A cutting device may be provided to cut off the extremities of the weft threads which project from a face of the warp.

Where a selvedge is to be produced at each side of a dividing gap or gaps in the warp sheet, a cutting device or devices are provided to cut the weft threads at the gap or gaps and thereby create weft ends, and there are two of the said arms to turn some of the ends into the warp at both sides of the gap or each gap, and furthermore there is a hook or hooks at each side of the gap or each gap to draw the extremities of the inturned weft ends and non-inturned weft ends through to one face of the warp sheet, and in addition there may be a trapping member at one side of the gap or each gap to hold the remaining weft threads from slipping longitudinally.

There are preferably two or more alternately operated hooks which are spaced apart to draw the extremities of the inturned weft ends and the non-inturned weft thread ends through to a face of the warp between different adjacent warp threads alternately, so as to stagger the positions of the junctions of the weft threads of a pair relative to the junctions of the weft threads of the next pair or succeeding pairs.

In the more or less diagrammatic drawings—

Figures 1 and 1A are two different halves of a plan view of a mechanism for producing four selvedges.

Figure 2 is a side elevation of the said mechanism.

Figure 3 is a side view in section taken on line 3—3 of Figure 1.

Figure 4 is a fragmentary plan view, partly in section, illustrating a detail and drawn to a larger scale.

Figure 5 is a side view in section, taken on line 5—5 of Figure 6.

Figure 6 is a detached plan view of the said detail.

Figure 7 is a fragmentary view in section and illustrates another detail.

Figure 11 is a side view in section taken on line 11—11 of Figure 10.

Figure 12 is a diagrammatic end view and Figure 13 is a diagrammatic plan view illustrating the four selvedges which are produced by the illustrated mechanism.

Figure 1:
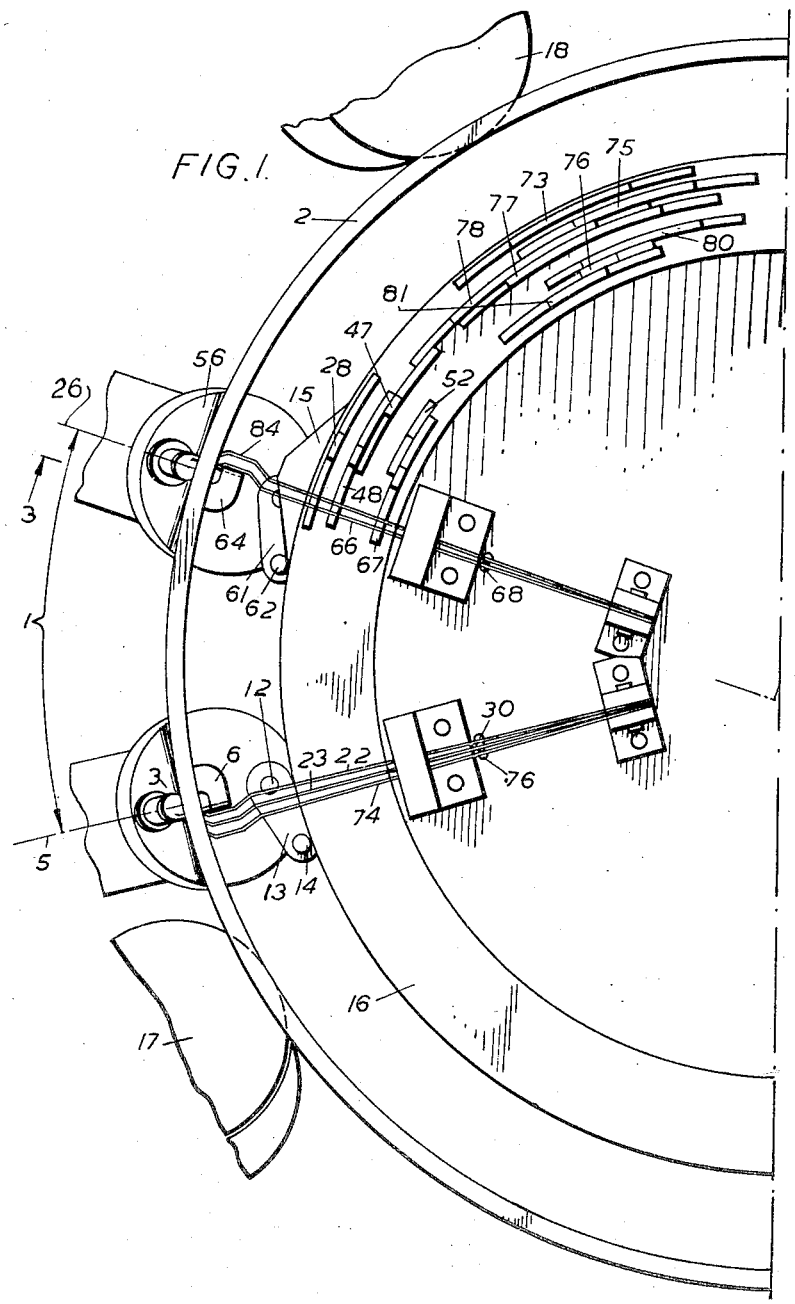

Referring to the drawings, in the construction shown therein, as applied to a circular loom in which the warp has a gap 1, Figure 1, the warp threads, of which the threads 5, 24, 25 and 26 are indicated are radial and pass under a ring 2 at which the fell is situated, and all the weft threads are separate and somewhat longer than the width of the warp sheet, and there is provided a stationary box 3 in which a spindle 4, Figures 4, 5 and 6, is rotatably mounted. The spindle 4 has at its upper end an inserting arm 6 adapted to swing into the shed of the warp when the spindle 4 is rotated. The arm has a channel 7 which in the starting position of the arm faces outwards from the fell and in the ending position of the arm faces inwards towards the fell, with the arm fully engaged with the warp at the edge of the warp. At the end of the channel there is a leaf spring 8 to clip the one end of a weft thread between it and the arm, a pin 9 secured to the arm 6 and projecting through the spring 8 being provided to limit the degree of penetration of the said end between the spring 8 and the arm 6.

The spindle 4 has a toothed bevel wheel 10 in mesh with a toothed quadrant 11 which is mounted on a spindle 12 journalled in the box 3 and having an arm 13 provided with a stud 14. The stud 14 is actuated by a cam 15, Figure 1, on a cam ring 16 rotated at the same speed as the loom shuttles each of which has a weft thread beating-up wheel 17, 18, 19 and 20 respectively. Actuation of the stud 14 results in rotation of the arm 6 180° from the starting position shown in full lines in Figure 4 into the ending position shown in dot-and-dash lines. A tension spring 21 is tensioned when the arm 6 is actuated and returns the arm 6 to the starting position after the cam 15 has ceased to displace the said arm. To lay the first weft thread of a repeated series of four weft threads in the warp, its one end is received in the gap 1 by the channel 7 and held by the spring 8 whilst its other end is carried through the shed of the warp by the shuttle which has the beating-up wheel 17 and which travels in anti-clockwise direction circularly round the fell ring 2. After the shed has been changed behind the said shuttle, the cam 15, which also moves in anti-clockwise direction flicks the arm 6 from the starting position through an angle of 180° into the shed at the edge of the warp and thereby bends the thread end into the shed so that the said end takes a loop form with the edge warp thread 5 and other warp threads extending through the loop.

Two cranked extracting levers 22 and 23 respectively, Figure 1, are provided side by side near that edge of the warp which has the edge thread 5 and each of the levers has an upstanding hook 27, Figures 3 and 7, or catch at its end. The levers 22 and 23 are raised by cams 28 and 29, Figure 1, respectively so as to push the hooks or catches upwards through the warp between adjacent warp threads into cavities 130, Figure 7, in the fell ring 2 and then allow them to fall back again into a position beneath the warp. The hook 27 or catch on the lever 22 engages between differernt adjacent warp threads from those between which the hook 27 or catch on the lever 23 engages.

As the arm 6 is operated, the lever 22 is raised by a cam 28 on the rotated cam ring 16. The lever 22 does not fall until the arm 6 has flicked the said weft thread end into the warp, whereupon the cam 28 allows the lever to fall, the fall being assisted by a tension spring 30, Figure 1. The hook 27 on the lever 22 has the said weft thread end held in its path by the arm 6 and therefore the hook 27 draws the said end downwards through the warp so that the extremity of the said end hangs from the underside of the fabric. To enable the arm 6 to bring the weft thread end into the path of the hook 27, the arm is provided with a notch 133, Figure 4, to accommodate the hook. The position of the arm 6 when holding the weft thread end in the path of the hook is indicated in dot-and-dash lines in Figure 4.

In the example chosen to illustrate the invention the warp sheet is shown as divided into two sections one of which commences with the warp thread 5 and ends with the warp thread 24 and the other commences with the warp thread 25 and ends with the warp thread 26, for the purpose of weaving a separate piece of fabric from each section. The weft thread is laid in the warp at the fell of the fabric by the beating-up wheel 17 so that it extends round the fell ring 2 to a point beyond the warp thread 26.

Figure 10:
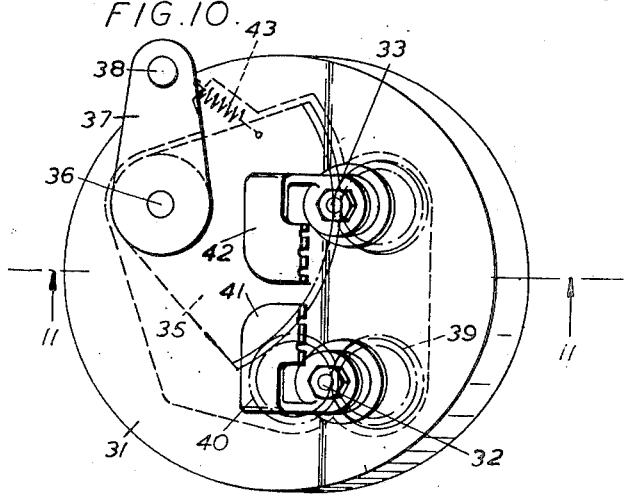
Figure 10 is a detached plan view of still another detail.

At the gap defined by the warp threads 24 and 25 there is a box 31, see particularly Figures 10 and 11, in which two spindles 32 and 33 respectively are mounted. The spindle 33 has a toothed bevel wheel 34 in direct mesh with a quadrant 35 provided on a shaft 36 journalled in the box 31 and having an arm 37 provided with a stud 38. The spindle 32 also has a toothed bevel wheel 39 connected to the quadrant 35 by a toothed carrier wheel 40 journalled in the box 31. The spindle 32 has an arm 41. The spindle 33 has an arm 42. The arm 42 is similar to the hereinbefore described arm 6 and the arm 41 is also similar to the arm 6 with the exceptions that it projects in reverse direction when in the starting position and has two hook accommodating gaps. The quadrant 35 is acted on by a tension spring 43 and operates to rotate the arms always in reverse directions relative to each other.

After the wheel 17 crosses the gap 44 between the warp threads 24 and 25 and the shed has changed behind the wheel 17, hooks on extracting levers 45 and 46 respectively are raised into cavities in the fell ring 2 by the action on the levers of cams 47 and 48 respectively provided on the cam ring 16 and the weft thread is sheared between a stationary cutting blade 49, Figure 3, on the fell ring 2 and a cutting blade 50 provided on a lever 51 operated by a cam 52, Figure 1, on the cam ring 16. The hooks on the levers 45 and 46 are similar to the hooks 27 on the levers 22 and 23. The lever 51 is returned to its inoperative position by a tension spring 53, Figure 3. Before the thread is cut, it is caught by the arms 41 and 42. The two weft thread ends produced by the said cutting are therefore held by the said arms. A cam 15, Figure 1, on the rotating cam ring 16 operates the arms by its action on the stud 38 to rotate them in reverse directions and thereby flick one end into the warp at one side of the gap 44 and the other end into the warp at the other side of the gap 44 after the warp has been shedded. The arms 41 and 42 are then in the ending position with the hooks on the levers 45 and 46 accommodated in some of the gaps therein. The cams 47 and 48 thereupon allow the levers 45 and 46 to descend, aided by tension springs 54 and 55 respectively, so that the said two ends are caught by the hooks thereon and their extremities pulled downwards through the warp.

Figure 8:
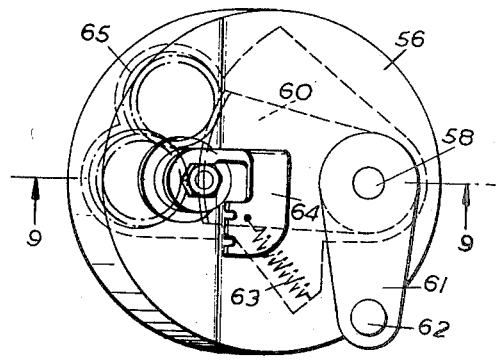
Figure 8 is a detached plan view of still another detail.
Figure 9:
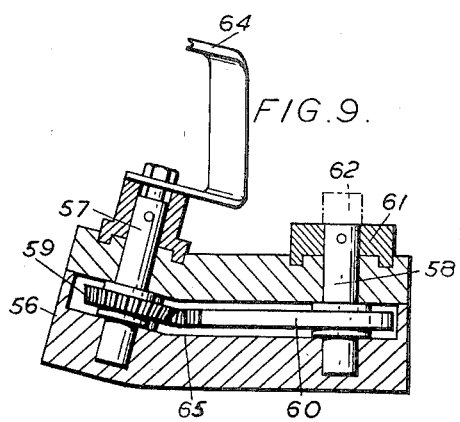
Figure 9 is a side view in section taken on line 9—9 of Figure 8.

At the weft thread 26 there is a box 56, see particularly Figures 8 and 9 in which are journalled spindles 57 and 58 connected together by a toothed bevel wheel 59 on the spindle 57 meshing with a toothed carrier wheel 65 journalled in the box 56 and meshing with a toothed quadrant 60 on the spindle 58. The spindle 58 is driven by an arm 61 mounted thereon and having a stud 62 acted on by the cam 15. The quadrant is acted on by a tension spring 63. The spindle 57 has an arm 64 similar to the arm 6 but having two hook accommodating gaps and extending and rotating in reverse direction to that arm. That end of the weft thread which projects beyond the warp thread 26 into the gap 1 is caught by the arm 64 and turned by the action of the cam 15 back into the shed after the warp thread 26 and adjacent warp threads have been shedded. Before the said end of the weft thread is turned in a hook similar to the hook 27 but provided on an extracting lever 66 is pushed into a cavity in the fell ring 2 by a cam 67, Figure 1. After the said end has been turned in, the cam 67 allows the lever 66 to fall with the assistance of a tension spring 68. The hook on the lever 66 is accommodated in one of the gaps in the arm and falls with the lever, thereby drawing the extremity of the said end downwards between adjacent warp threads out of the warp. This completes the insertion of the first weft thread of a repeated series of four weft threads. The ends of the first weft thread are turned into and woven in the warp.

This weft thread is designated 69 in Figure 12 which shows diagrammatically portions of the produced two pieces of fabric straightened out.

The structure of the two selvedges of each of the two pieces is shown in the said Figure 12. The second, third and fourth weft threads of each series are designated 70, 71 and 72 respectively.

The second weft thread is laid in the warp by the shuttle which has the beating-up wheel 18, after the shed has been changed from that in which the first thread has been laid. Before the wheel arrives at the warp thread 5, a cam 73 on the rotating cam ring 16 acts on the lever 22 to move the hook on the said lever into its cavity in the fell ring 2. The hook remains in the cavity until the wheel 18 has passed it. A trapping lever 74, see also Figure 2, is provided and is actuated by a cam 75 after the wheel 18 has passed the levers 22 and 74 to trap the laid portion of the second weft thread against longitudinal movement. After the wheel 18 has passed and whilst the said thread is still trapped, the cam 73 allows the lever 22 to descend and cause its hook to draw the extremity of the said thread downwards between the same two warp threads that the extremity of the first thread was drawn, so that it hangs from the underside of the fabric. The lever 74 is then allowed by the cam 75 to descend, aided by a tension spring 76 and untrap the thread. The wheel continues to lay the second weft thread and when it has passed the gap 44, the lever 51 is operated by a cam 76 to cause the thread to be cut by the blades 49 and 50. Before the wheel 18 reaches the gap 44, the levers 45 and 46 are raised by the cams 77 and 78 respectively so that their hooks, which are similar to the hooks 27, are in their cavities in the fell ring 2. Before the thread is cut, a trapping lever 79 is raised by a cam 80 to trap the thread between it and the fell ring 2 and thereby prevent longitudinal displacement of that part of the thread which is in the second section of the warp. After the thread has been cut the cams 77 and 78 allow the levers 45 and 46 to fall and their hooks thereby to draw the extremities of the ends produced by the cut downwards between the same adjacent warp threads through which the extremities of the first cut thread were drawn, so that they project from the lower side of the two pieces of fabric. The shuttle carrying the wheel 18 continues to lay the second weft thread until it has passed the warp thread 26, when the end of the thread carried by it is reached. Before the wheel 18 has passed the warp thread 26, the lever 66 is raised by a cam 81 to bring its hook into the cavity provided in the fell ring 2 therefor. After the wheel 18 has passed the warp thread 26, the cam 81 allows the lever to fall and cause its hook to draw the extremity of the thread to the underside of the warp between the same two warp threads between which the extremity of the first thread was drawn. In each piece of fabric, the second thread, namely the weft thread 70 lies in alignment with the inwardly bent ends of the first thread, namely the weft thread 69 with the points of junction of the ends of the two threads at a predetermined distance from the edges of the piece.

The third thread is laid in the warp by the shuttle having the beating-up wheel 19, after the shed has been changed from that existing when the second thread was inserted. The third thread is cut by actuation of the cutting lever 51 by a cam 90, Figure 1A, on the rotating cam ring 16, and the four ends thereof are bent into the two warp sections by the arms 6, 41, 42 and 64 in a manner similar to the first thread. Different extracting levers and hooks are however provided to draw its four extremities to the under side of the warp or fabric. These levers are designated 23, 82, 83 and 84. It will be noticed that the distance of each of these levers from the nearest edge thread 5, 24, 25 and 26 respectively, of the warp is greater than the distance from the said edge threads of the levers 22, 45, 46 and 66 employed to draw the extremities of the first and second weft threads to the underside of the warp or fabric. Therefore when their hooks, which are similar to the hook 27, draw the extremities of the third weft thread through the warp or fabric, they draw them between different adjacent warp threads than those between which the extremities of the first and second weft threads were drawn. This is clear from Figure 12 in which the junctions of the ends of the first and second threads 69 and 70 respectively are nearer the edges of the fabrics than are those of the third and fourth threads 71 and 72 respectively. In the manipulation of the third thread, the levers 23, 82, 83 and 84 are operated at the proper times by cams 29, 85, 86 and 87 respectively on the rotating cam ring 16.

To complete the series of four differently manipulated weft threads, the fourth thread is laid in the warp by the shuttle carrying the beating-up wheel 20 and is trapped near the edges of the warp sections at the proper times by the trapping levers 74 and 79 which are actuated by the cams 88 and 89 respectively. The fourth thread is cut in two by operation of the cutting lever 51 by a cam 91 on the rotating cam ring 16. The four extremities of the cut fourth thread are drawn to the underside of the warp or fabric between the same pairs of warp threads as those through which the extremities of the third thread were drawn, by the extracting levers 23, 82, 83 and 84 on their fall after being actuated by cams 92, 93, 94 and 95 respectively provided on the rotating cam ring 16. The fourth thread, i. e. the thread 72 of Figure 12 is in alignment with the turned in ends of the third thread, i. e. the thread 71, but the junctions of the thread 72 with the thread 71 are further away from the edges of the fabric than are the junctions of the thread 69 with the thread 70. This alignment of threads coupled with the inturned ends of alternate threads gives selvedges which possess no more weft threads than does the remainder of the fabric and has no thickened parts. There is therefore no overcrowding of weft threads in the selvedges. Due to the staggered junctions the selevedges are stronger than if the junctions were not staggered.

All the extremities drawn to the underside or back of the fabrics by the hooks are shaved off close to the underside or back face of the fabric by a rotary cutter 96, Figure 3, as the fabric after it has been woven is drawn by the take up of the loom along the inner side of the fell ring 2.

Each of the extracting levers and trapping levers and the cutting lever is provided with a foot 97 through which the cams on the upper face of the cam ring 16 act on the levers. This arrangement enables the said cams to operate on the individual levers individually as required to produce the selvedges shown in Figure 12.

Where only one piece of fabric is to be produced, there is no gap 44 in the warp and the extracting, trapping and cutting devices at the said gap are omitted, as are also the box 31 and the cams operating the said levers and the arms on the said box. Where more than two pieces of fabric are to be produced an additional gap or gaps are provided in the warp and additional levers and an additional double armed box or boxes and the necessary additional operating cams are provided to cut the threads and produce selvedges at the additional gap or gaps.

Whenever the term "thread" is hereinbefore and hereinafter used, it is to be understood to include "yarn" and any other filament.

I claim:

1. A mechanism for producing selvedges on a plurality of pieces of woven fabric produced by the passage of weft inserting members through a warp divided into sections, comprising an arm at each of the edges of each section for turning the ends of some of the weft into the warp, a cutting device between adjacent sections for providing some of the said ends by cutting through the weft between the sections, and an extractor at each edge of each section for removing the extremities of the ends from the shed of the warp and exposing them at one face of the fabrics, and a trapping member at each edge section for trapping some of the weft against slipping longitudinally.

2. A mechanism for producing selvedges on a plurality of pieces of woven fabric produced by the passage of weft inserting members through a warp divided into sections spaced apart, comprising a swingable arm at each edge of each section for turning the ends of some of the weft into the warp, a cutting device between adjacent edges of two sections for cutting through the weft where it extends from the one to the other of the said sections, a trapping member at each end of each section for preventing longitudinal displacement of some of the weft, extractors disposed a predetermined distance inwards from the edges of the sections for extracting the extremities of some weft ends from the fabric fells to one face of the fabrics, and further extractors disposed a different predetermined distance inwards from the edges of the sections for extracting the extremities of other of the weft ends from the fabric fells at the said face of the fabrics but at places laterally and longitudinally displaced from the places where the first named extremities are extracted.

3. A mechanism for producing a selvedge, comprising an arm for engaging and turning into the warp an end of each alternate piece of weft after the thread has been inserted and woven into the warp, in combination with a separate extractor which is additional to the arm and is provided for catching the extremity of the said end after it has been turned into the warp and then drawing the said extremity out of the warp, and actuating means for pushing the extractor through a face of the warp and withdrawing it again for catching and drawing out the said extremity.

4. A mechanism for producing a selvedge, comprising an arm rotatable in a plane for engaging and turning into the warp an end of a piece of weft, in combination with an extractor which is movable in a plane which is other than parallel to the first named plane, the extractor being operable subsequently of the arm and being for passing to and fro through the warp at a different place from that where the arm turns into the warp and for drawing the extremity of the said end out through one face of the warp at the said different place, a trapping member for holding another piece of weft against slipping longitudinally in the warp, and driving means for turning the arm, actuating the extractor and operating the trapping member at the requisite times.

5. A mechanism for producing a selvedge on a fabric, comprising weft inserting devices for inserting into a warp separate pieces of weft whose lengths are somewhat greater than the width of the fabric, arms pivotally mounted beyond the edges of the warp for turning the ends of some of the said pieces into the warp from the said edge after those pieces have been woven in, hooks separate from the arms for dragging the extremities of the ends of the pieces of weft yarn out of the warp through one face of the fabric, and cutting means for trimming off the said extremities after they have been dragged out of the said face of the warp.

6. A mechanism for producing a selvedge on fabric woven in a circular loom, comprising a rotatable cam ring rotatably mounted on the loom, a stationary fell member provided on the loom for supporting the fell of the fabric, levers, oscillatably mounted on the loom and carrying hooks for passage through the warp of the fabric from one face of the warp to the other and consequent withdrawal of the extremities of weft ends out of the warp to one face of the warp, trapping levers oscillatably mounted on the loom for trapping weft between them and the fell ring against slipping, rotatable arms on the loom for turning the ends of some weft threads into the warp and cams on the cam ring for operating the levers and arms.

References Cited in the file of this patent

UNITED STATES PATENTS

| Number | Name | Date |
|---|---|---|
| 1,948,051 | Rossman | Feb. 20, 1934 |
| 2,034,487 | Rossman | Mar. 17, 1936 |
| 2,185,308 | Pfarrwaller | Jan. 2, 1940 |

FOREIGN PATENTS

| Number | Country | Date |
|---|---|---|
| 276,666 | Great Britain | Jan. 12, 1928 |